INVENTORS.
Norman V. Beaman.
BY Harold P. Hudson.
Hugo E. Gauss.
Wood, Herron & Evans.
ATTORNEYS.

July 31, 1962  N. V. BEAMAN ETAL  3,046,812
VERTICAL MIXER
Filed Oct. 27, 1959  6 Sheets-Sheet 3

INVENTORS.
Norman V. Beaman.
BY Harold P. Hudson.
Hugo E. Gauss.
Wood, Herron & Evans.
ATTORNEYS.

INVENTORS.
Norman V. Beaman.
BY Harold P. Hudson.
Hugo E. Gauss.
Wood, Herron & Evans.
ATTORNEYS.

United States Patent Office 3,046,812
Patented July 31, 1962

3,046,812
VERTICAL MIXER
Norman V. Beaman, La Habra, Calif., Harold P. Hudson, Kansas City, Kans., and Hugo E. Gauss, Batavia, Ohio, assignors, by mesne assignments, to C. J. Patterson Company, Kansas City, Mo., a corporation of Missouri
Filed Oct. 27, 1959, Ser. No. 849,017
3 Claims. (Cl. 74—660)

This invention relates to mixing machines of the vertical type in which the material being mixed is disposed in a stationary receptacle; and an agitator which depends into the receptacle is rotated on a vertical axis and at the same time is shifted in a planetary movement about the axis of the receptacle. The present invention is particularly directed to a head construction for a heavy duty mixer of this type.

The present vertical mixer is especially adapted for performing mixing operations in a batch type dough handling process, such as the process disclosed in C. J. Patterson Patent No. 2,869,484. The process disclosed in that patent is a batch type process developed for use in commercial bakeries. In carrying out the process large quantities, in present commercial practice up to six hundred pounds, of dough are mixed in large movable bowls. It is to be expressly understood, however, that the present mixer is not limited to use with such processes, but rather the present mixer has a wide range of utility, not only in connection with other types of bakery processes, but also in the mixing of other materials, such as rocket fuels, and the like.

A vertical mixer of the type which the present invention is concerned with, includes any suitable clamping mechanism for holding a bowl or other receptacle stationary beneath the mixer head which supports a rotating beater or agitator extending downwardly about a vertical axis into the bowl. It has been found extremely advantageous especially in the bakery field, to employ an agitator of bifurcated construction comprising two spaced vertical arms secured to a main agitator shaft. The arms are disposed for rotation about the agitator axis so that the arms alternately pass adjacent to the vertical outside wall of the bowl and around a center post of the bowl. At the same time, the agitator shaft is shifted in a planetary motion about the axis of the bowl. Thus, the mixer is effective to efficiently mix the contents of the dough within the bowl and also to stretch the dough around the center post.

It will readily be appreciated that when such a mixer is used to handle up to six hundred pounds of dough, exceedingly severe loads are imposed upon the agitator and hence upon the mixer head which supports and drives the agitator. In one commercial form of the present mixer a fifty horsepower motor is used to drive the agitator and very substantial forces are created due to the combination of the planetary movement of the agitator shaft and the rotation of the beaters around this shaft. These difficulties are further aggravated by the inherent nature of a vertical mixer in which the mixer head over-hangs the beaters and is effective to support only the upper end of the agitator shaft.

The principal object of the present invention is to provide a heavy duty mixer construction effective to drive an agitator shaft in a planetary motion, while simultaneously rotating the shaft about its own axis. The present mixer construction minimizes the effects of the extremely heavy loads on the bearings, shafts, gears and other parts so that they do not fail in service.

A further object of the present invention is to provide a head construction for a mixer in which the head is completely enclosed so that all of the bearings and gears within the head can be constantly lubricated with oil to prevent overheating or failure of the bearings and gears during even protracted periods of constant usage.

More particularly, the present invention is predicated upon the concept of providing a head construction for a mixer in which the head is supported from a rigid platen and includes a rigid hollow depending center member extending downwardly from the platen. A vertical main shaft is connected at its upper end to a motor drive and is rotatably journalled within the hollow center member at the upper and lower ends thereof. The main shaft carries at its lower end closely adjacent to the bottom of the center member a drive pinion which engages a pinion on a depending agitator shaft whereby a rotary motion is imparted to the shaft. The agitator shaft is rotatably mounted in a depending bell-shaped housing member which is in turn rotatably supported at its upper end by a bearing carried by the center member and at its lower end by a bearing on the main shaft. The housing also carries a planetary gear train connected to the agitator shaft and including a pinion in engagement with a stationary sun gear formed on the periphery of the depending center member. This planetary gear system is effective to impart a planetary movement to the agitator shaft so that that shaft is shifted in a large circle about the axis of the main shaft while the agitator shaft rotates upon its own axis.

The entire bottom of the bell-shaped housing is sealed and an oil pump is mounted within the housing. This pump, in the preferred embodiment, is a gear driven pump connected to the main drive pinion, and is effective to create a constant oil flow over all of the bearings and gears mounted within the housing. Consequently, despite the exceedingly heavy loads imposed upon the gears and bearings, these members do not overheat or fail even after indefinite periods of continuous use.

One of the principal advantages of the present head construction is that the loads on the main shaft and its bearings, which are among the most critical elements of the mixer construction, are minimized. In the first place, the present construction with the depending center post facilitates the provision of widely spaced bearings on the main shaft and the lowermost of these bearings is disposed closely adjacent to the main drive pinion and the lower housing bearing. Consequently, the transverse loads imposed upon the main shaft are closely coupled to its lower bearing and thus have a minimum moment arm, while at the same time the couple arm resisting bending between the main shaft bearings is of maximum size.

A still further advantage of this construction is that the sideways thrust of the agitator shaft is in part transmitted directly to the platen through the planetary sun gear and the rigid depending center member. Moreover, the constantly changing lateral forces imposed upon the agitator shaft are in part smoothed out by the bearing connection of the shaft to the depending housing which is of substantial mass. A further portion of the horizontal load on the agitator shaft is applied directly to the stationary platen through the upper bearings connecting the housing to the vertical center post. Thus, the main shaft does not have to transmit more than a fraction of the horizontal load of the agitator shaft, since a portion of this load is absorbed by the inertia of the depending housing, and other portions of the load are transmitted directly to the stationary frame through the sun gear and upper housing connection.

These and other objects and advantages of the present invention will be more readily apparent from a consideration of the following detailed description of the drawings illustrating a preferred form of the invention.

Figure 1:
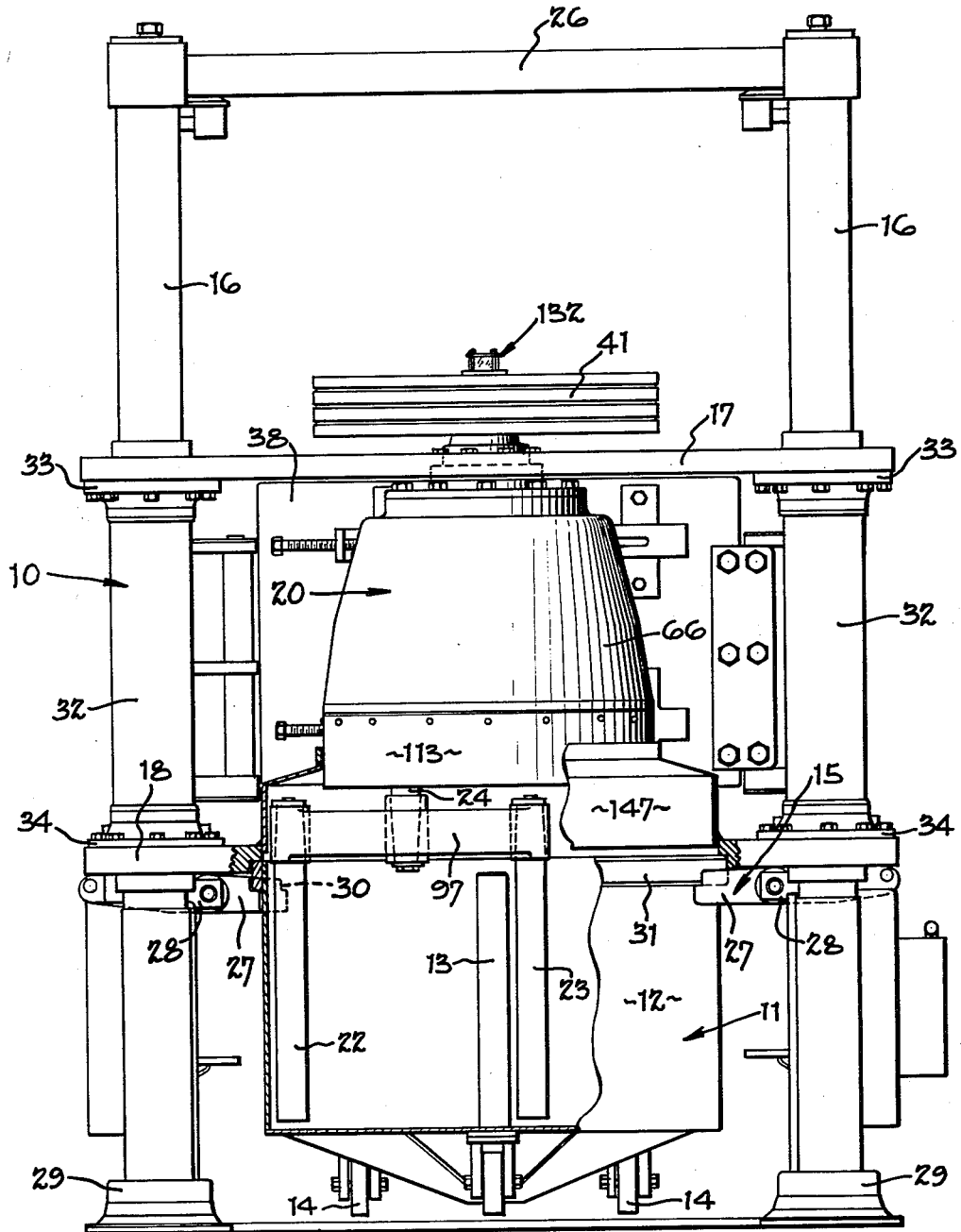
FIGURE 1 is a front elevational view of a mixer constructed in accordance with the principles of the present invention, a portion of the bowl and hook being broken away to show details of the mixer construction.
Figure 2:
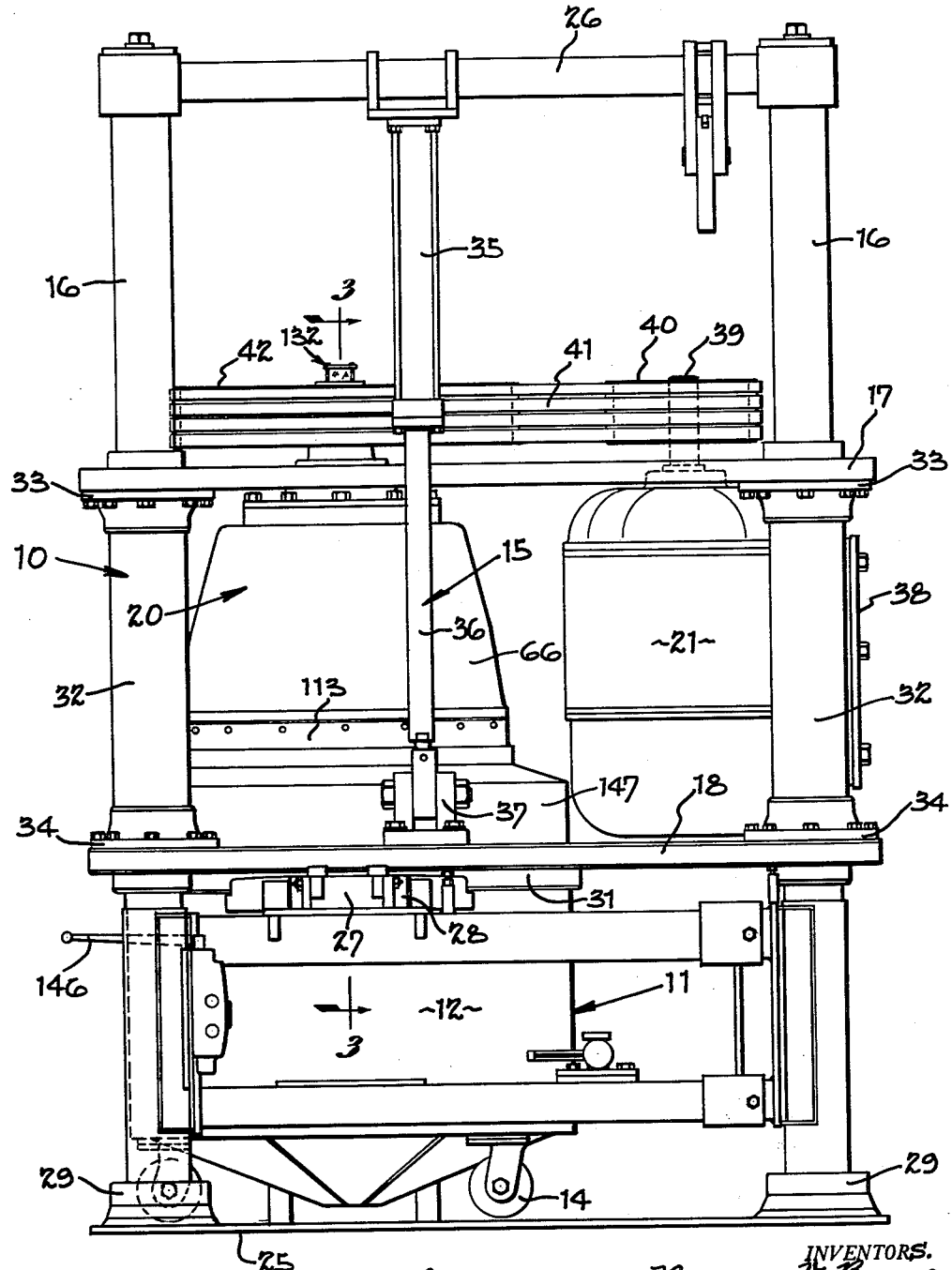
FIGURE 2 is a side elevational view of the mixer shown in FIGURE 1.

As is best shown in FIGURE 1, the present mixer 10 is particularly adapted to mix the contents of a large open top cylindrical bowl 11. The details of construction of the bowl constitute no part of the present invention. In general, however, the bowl includes an upright cylindrical receptacle 12 having an upwardly extending center post 13 and a series of wheels 14 by means of which the bowl may be shifted over the floor of a bakery. A typical bowl of this type has a capacity of approximately six hundred pounds of dough and is particularly advantageous for use in conjunction with the newly developed batch type bread making processes, such as that disclosed in C. J. Patterson Patent No. 2,869,484.

However, it is to be expressly understood that the utility of the present mixer is not limited to use with bowls of this type; nor is it limited to use in connection with the process disclosed in Patent No. 2,869,484. Rather, the present mixer can be advantageously employed in connection with many other types of bakery processes; and also the mixer can be used to mix various chemicals and other materials, such as rocket fuels. It is contemplated that in order to provide the most efficient mixing action for a given application, the mixer may be altered slightly in form from the mixer herein described. However, it is considered that from the foregoing discussion of the general principles of the present invention and the following disclosure of one preferred embodiment, those skilled in the art will readily comprehend various modifications of which the present invention is susceptible.

The present mixer 10 further comprises a bowl lifting and supporting mechanism 15 for engaging the bowl and rigidly supporting it in a slightly elevated position during the mixing process. The bowl lifting mechanism is mounted upon four spaced vertical columns 16. These columns further support vertically movable upper and lower platens 17 and 18 which carry head 20 and motor 21. When the platens are in their lowermost position as shown in FIGURE 1, mixer head 20 is disposed above bowl 11 in such a manner that the depending vertical mixer arms or beaters 22 and 23 carried by agitator shaft 24 are disposed within the bowl. Agitator shaft 24 is driven so that the agitator shaft rotates about its own axis and at the same time is moved in a circular path around the axis of the bowl.

More particularly, the present mixer 10 comprises four vertical columns or posts 16 which are supported in any suitable manner, such as by means of sockets 29, upon a base 25. The upper ends of the posts are rigidly connected by top cross members 26. The pairs of posts on each side of the unit support a bowl lifting arm 27. Each of the bowl lifting arms is pivotally mounted on frame members 28 carried by the vertical posts. The inner ends of each of the arms 27 is curved and is provided with a shoulder 30 adapted to engage the uppermost rims 31 of bowl member 11. Arms 27 are disposed so that when the arms are pivoted inwardly in a horizontal direction, they clamp bowl member 11 between them and elevate the bowl slightly so that wheels 14 are raised above base 25.

Slidably mounted upon posts 16 above bowl lifting mechanism 15, are upper and lower platens 17 and 18. These platens are bolted or otherwise secured to four sleeve members 32. Each of the sleeves slidably engages one of the vertical posts 16 and is provided with upper and lower horizontal flanges 33 and 34. The upper platen is bolted or otherwise secured to flanges 33, while the lower platen is bolted or otherwise secured to flanges 34. The upper and lower platens are adapted to be shifted in unison by a double-acting hydraulic cylinder 35 mounted upon cross arm 26 and having a piston rod 36 attached to lower platen 18 through a coupling member 37.

A vertical motor mounting plate 38 is bolted or secured in any suitable manner to rear sleeves 32. This plate supports in any suitable manner motor 21. One suitable form of motor is a fifty horsepower A.C. motor having a vertically disposed armature shaft 39 to which is attached a drive sheave 40. The drive sheave 40 carries a plurality of belts 41 which interconnect that sheave and a driven sheave 42 mounted upon main drive shaft 43 of head 20.

The details of the mixer thus far described, constitute no part of the present invention which is concerned solely with the construction of the head, and it is contemplated that mixer heads embodying the present invention can be employed with mixers of a different construction than that described above.

Figure 3:
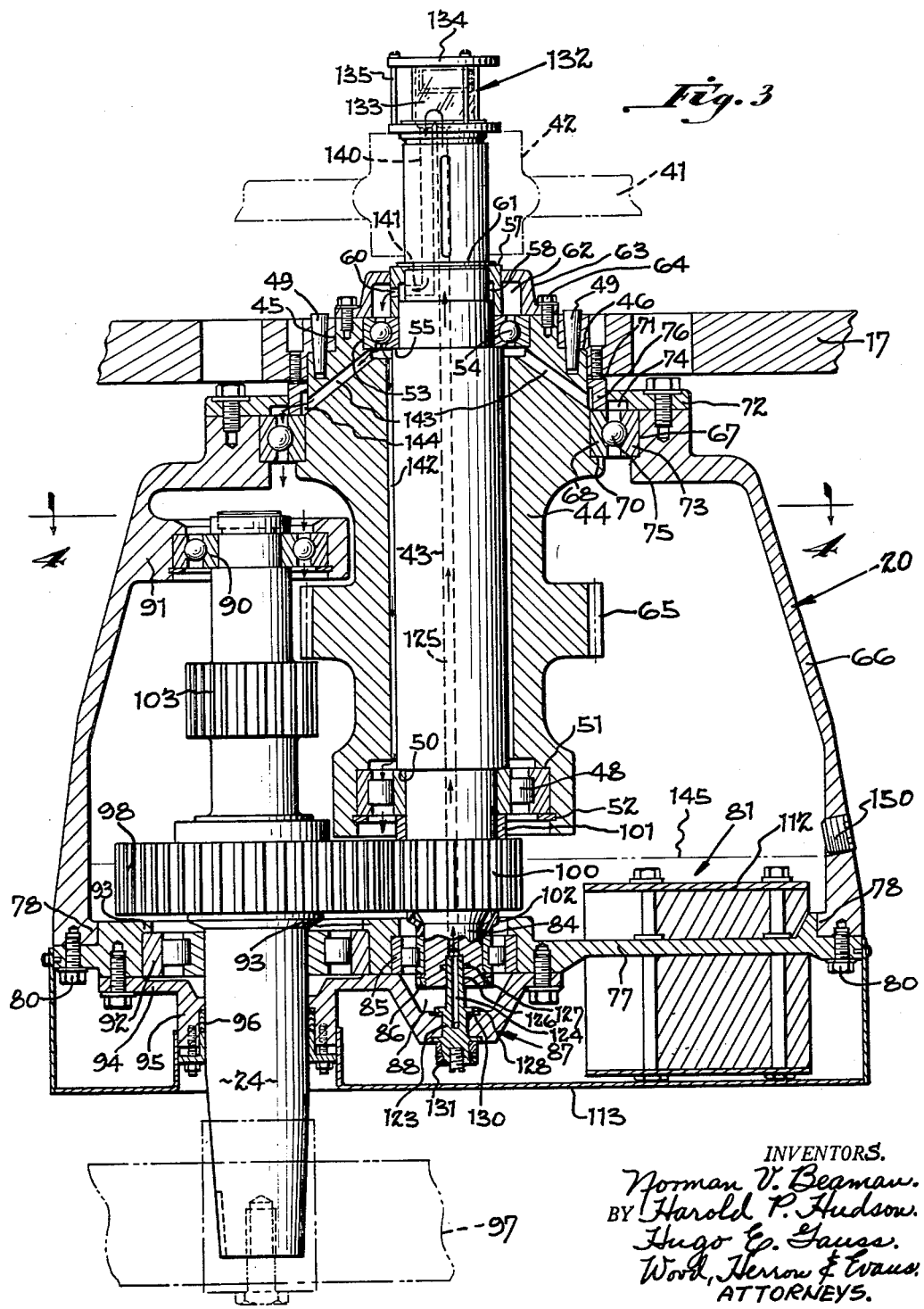
FIGURE 3 is a cross sectional view through the head taken along line 3—3 of FIGURE 2.
Figure 4:
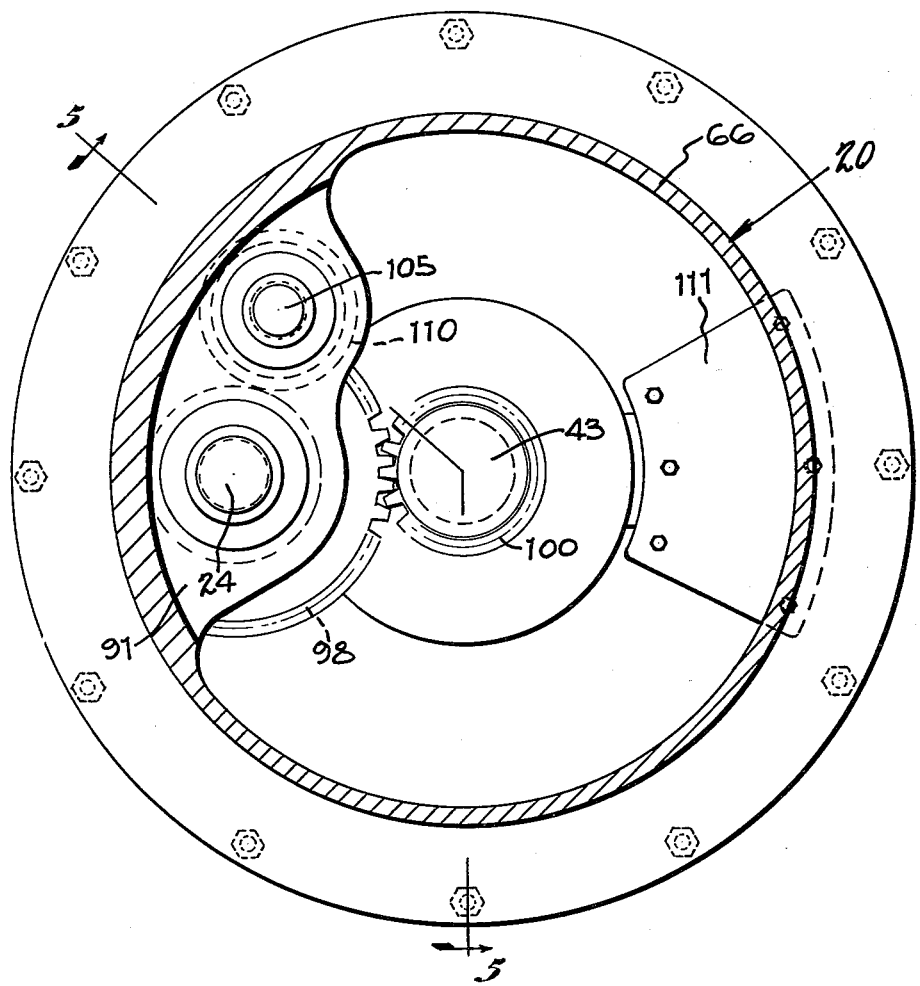
FIGURE 4 is a cross sectional view taken along line 4—4 of FIGURE 3.
Figure 5:
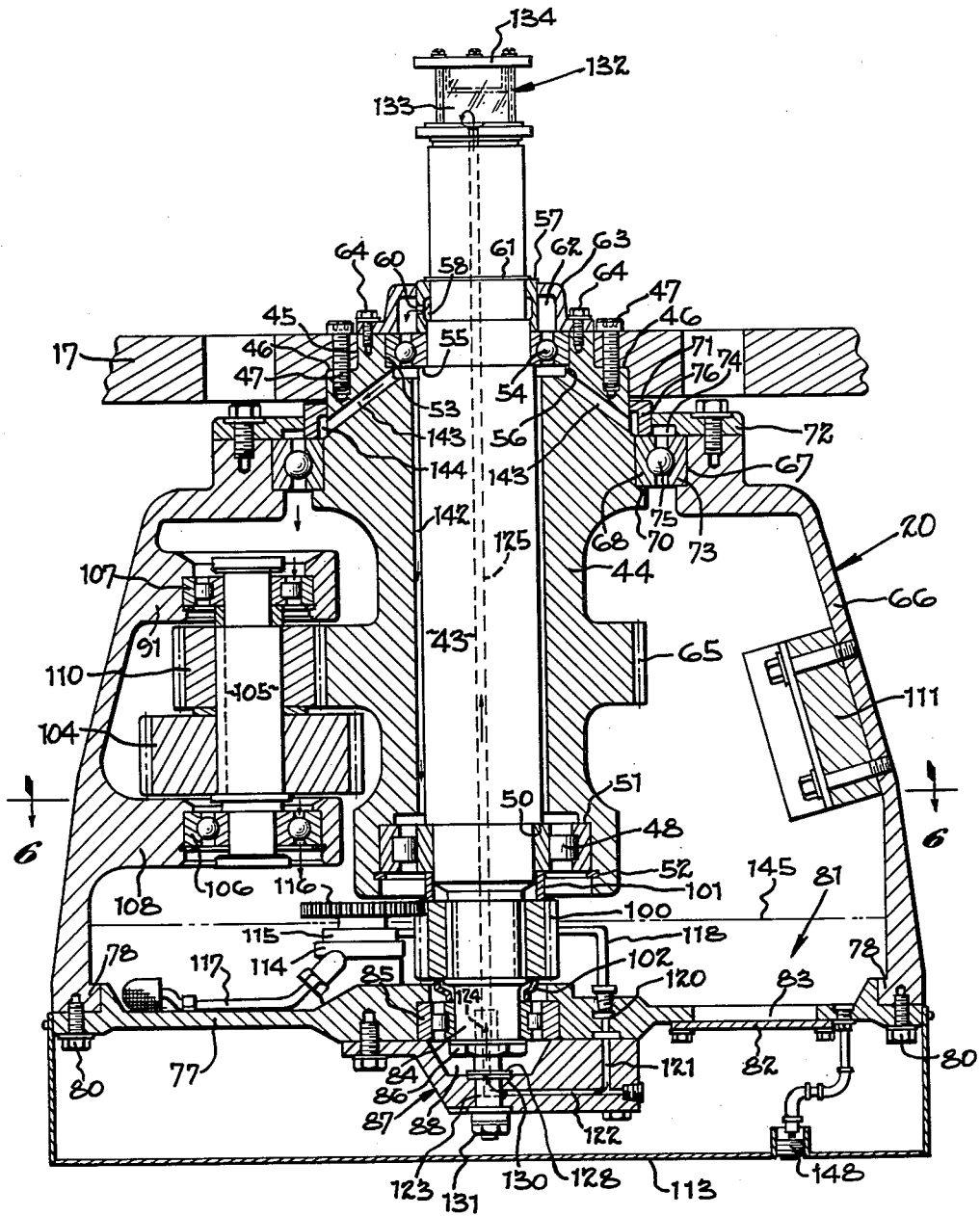
FIGURE 5 is a cross sectional view taken along line 5—5 of FIGURE 4.
Figure 6:
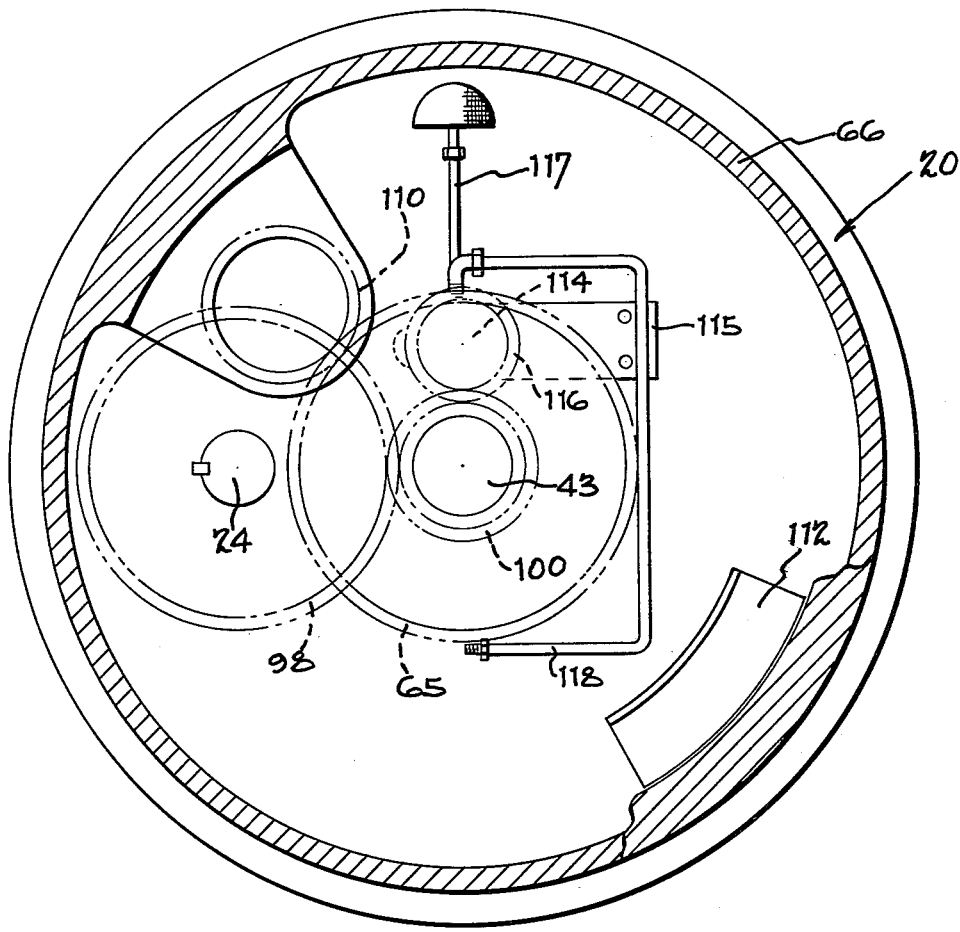
FIGURE 6 is a cross sectional view taken along line 6—6 of FIGURE 5.

The head 20 of the present invention is best shown in FIGURES 2–6. More particularly, head 20 includes a vertical hollow center member 44 preferably in the form of a heavy rigid casting. The uppermost end of vertical center member 44 is cylindrical and is received within an opening 45 in upper platen member 17. A shoulder 46 is formed on the upper end of vertical center member 44, this shoulder abuts a mating shoulder formed in the opening in upper platen 17. The platen 17 and center member 44 are rigidly secured together by means of a plurality of bolts 47 which pass through the platen and threadably engage tapped openings formed in shoulder 46. Additionally, a series of tapered pins 49 are driven through openings in platen 17 into registering openings in center member 44. Vertical center member 44 is provided with an enlarged axial bore adapted to receive main shaft 43, the diameter of the bore in center member 44 being greater than the outer diameter of the shaft so that the shaft is spaced from the center member's walls as shown in FIGURE 5.

Shaft 43 is rotatably supported by center member 44 through a lower radial thrust bearing 48, the inner and outer races of which respectively bear against a shoulder 50 on shaft 43 and a shoulder 51 formed in an enlargement of the central bore through center member 44. The bearing 48 is held in place by snap ring 52. The upper end of center member 44 is also provided with an enlarged opening 53 which receives the outer race of a radial and axial thrust bearing 54. The inner race of this axial thrust bearing is in engagement with a shoulder 55 formed on shaft 43, while the outer race of the bearing abuts a shoulder 56 formed on center member 44. An oil distributor member 57 having an annular chamber 58 and a radial port 60 is mounted above bearing 54. Oil distributor 57 is held in place by a snap ring 61 against bearing 54. Radial opening 60 interconnects annular chamber 58 formed in the oil distributor member 57 with an annular chamber 62 formed in a cap member 63 which is bolted to center member 44 as by means of bolts 64 and surrounds oil distributor member 57. The mid portion of center member 44 is machined to form a circular sun gear 65. It is to be understood that the walls of center member 44 are of substantial thickness so that the member does not deflect appreciably over any sideways loads imposed upon sun gear 65 or bearing 48.

Head 20 further comprises a housing member 66. This member is a generally bell shaped casting weighing several hundred pounds and is supported at its top by axial and radial thrust bearing 67 having an inner race 68 in engagement with annular shoulder 70 machined in the upper portion of stationary center member 44. A spacer member 71 is interposed between inner race 68 and upper platen 17. The outer race of the bearing seats in an annular groove machined in housing 66. An annular locking band 72 is bolted or otherwise joined to the upper surface of bell-shaped housing 66 in abutment with outer race 73 of bearing 67. Clamping band 72 is provided with a downwardly facing annular groove 74 disposed over balls 75 of bearing 67 and in communication with openings (not shown) formed in the downwardly extending leg 76 of spacer member 71.

The bottom edge of housing 66 carries a base member 77, the base member being secured to a flange 78 formed on the bottom edge of housing 66 as by means of bolts 80. It is to be understood that base member 77 completely encloses the bottom of the housing and forms a liquid tight chamber or oil sump 81 above the base 77. This chamber is adapted to hold a sizable quantity of oil, for example, eight gallons in one preferred embodiment. If desired, a suitable gasket material (not shown) may be interposed between base 77 and the lower rim of housing 66. In a preferred embodiment, the base member is provided with an inspection or cleaning plate 82 which fits over an opening 83 in the base and is bolted to the base member. Again, a gasket material may be placed between this plate and base if desired.

As is best shown in FIGURES 3 and 4, base member 77 is journalled for rotation about lower end 84 of main shaft 43 by means of radial thrust bearing 85. The inner race of this bearing is held in place by means of a bearing nut 86, threaded over the end of shaft 43. A lower shaft cap 87 is bolted to base member 77 beneath the opening formed in the base member for receiving bearing 85. The cap member 87 supports the outer bearing race and is provided with a well portion 88 disposed beneath and spaced from the lowermost end of the main shaft 43.

Agitator shaft 24 is journalled at its upper end in radial and axial thrust bearing 90, the bearing being seated in an ear 91 formed integral with and extending inwardly from the inner surface of bell housing member 66. A second thrust bearing 92 also supports the agitator shaft 24, bearing 92 being seated in base member 77 and being held between shoulders 93 formed in the base member and in extension 94 of cap member 87. Cap member 87 is provided with a downwardly extending flange 95 surrounding agitator shaft 24 and carrying chevron packing 96, or the like, effective to provide a liquid tight seal around the agitator shaft. The lower end of the agitator shaft carries a cross arm 97 and two spaced depending mixer arms 22 and 23. It is contemplated, however, that a different form of agitator member can be substituted for arms 22 and 23 for mixing materials other than dough.

Agitator shaft 24 carries a driven pinion 98 disposed in engagement with a drive pinion 100 carried by main shaft 43 closely adjacent to lower bearing 48. Drive pinion 100 is spaced from bearing 48 by spacer 101 and from bearing 85 by a spacer 102.

Agitator shaft 24 also carries a small pinion 103 disposed above driven pinion 98. Pinion 103 is disposed in engagement with a gear 104 mounted upon and keyed to an idler shaft 105. Idler shaft 105 is rotatably mounted in bearings 106 and 107 respectively carried by spaced lower and upper ears 91 and 108 formed on the inner surface of housing 66. Vertical idler shaft 105 has another gear 110 keyed thereto; gear 110 is in engagement with sun gear 65 formed on depending vertical center post member 44. The gears described above form a planetary gear train which is effective to rotate shaft 24 about its own axis and to cause shaft 24 to be moved planetwise about the axis of main shaft 43. A first counter-weight 111 is bolted or otherwise mounted on the interior of housing 66 on a portion of the housing diametrically opposite counter shaft 105. A second counter-weight 112 is bolted or otherwise secured to base member 77 diametrically opposite agitator shaft 24. A lower cover member 113 formed of sheet metal, or the like, is bolted or otherwise secured to housing 66 and extends across the bottom of that housing beneath base member 77, counter-weight 112, and cap member 87.

The lubrication system for the present head includes a gear driven pump 114 best shown in FIGURE 5. Pump 114 is mounted upon a bracket 115 which is in turn welded or otherwise secured to base member 77. Pump 114 includes a gear 116 which is in engagement with main drive pinion 100. The pump includes an inlet line 117 having an open intake disposed adjacent to base plate 77. The outlet line 118 of the pump 114 connects to a bore 120 formed in base plate 77. Bore 120 in turn is in fluid communication with a bore 121 formed in lower cap member 87. Bore 121 is joined to a transverse bore 122 formed in connector member 123. Connector 123 also includes an axial bore 124 which is aligned and communicates with a central bore 125 extending axially through main shaft 43.

The construction of connector member 123 is best shown in FIGURES 3 and 5. As there shown, connector member 123 includes an elongated cylindrical bore 126 which is loosely fitted within an enlargement formed in the lower end 84 of shaft 43. An O ring 127 provides a fluid seal between the connector member and shaft. Connector member 123 also is provided with a radial flange 128 which comprises a washer member 130 against the wall of cap member 87. The lower end of member 123 is threaded and receives a nut 131 which locks the connector in place.

Figure 7:
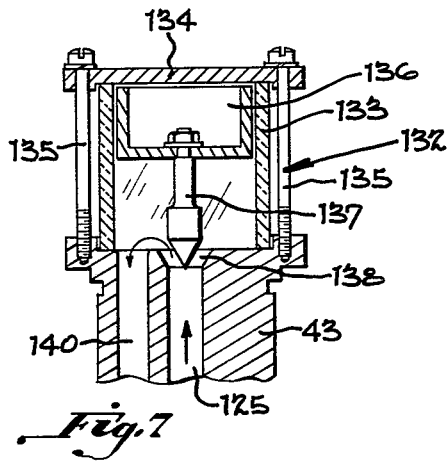
FIGURE 7 is an enlarged vertical cross sectional view through the oil flow indicator.

The upper end of the main shaft 43 which extends above plate 17, carries a flow indicator assembly 132. More particularly, as is best shown in FIGURES 3 and 7, the flow indicator assembly comprises a transparent cylinder sight glass 133 which is enclosed and held against the upper end of the shaft by means of cover plate 134, the cover plate in turn being bolted to the end of the shaft by means of elongated bolts 135. The oil flow indicator assembly 132 further includes a loose fitting piston or indicating member 136 slidably mounted within sight glass 133 and carrying a depending plunger or push rod 137. Push rod 137 has a conical lower end adapted to seat in an orifice 138 formed in the upper end of bore 125 in the main shaft 43.

Main shaft 43 further includes a second off-center bore 140 in fluid communication with the interior of sight glass 133 and with a transverse outlet bore 141 which empties into annular chamber 58 in oil distributor member 57 as indicated above. This member is provided with a radial opening 60 which opens into a larger annular chamber 62 in upper cap member 63. Annular chamber 62 is disposed above upper bearing 54 so that oil introduced into this chamber flows downwardly through the chamber over and through bearing 54. The oil there divides, a portion of the oil flowing downwardly in annular space 142 between main shaft 43 and the surrounding wall of vertical center member 44. The bottom opening of this space is disposed above bearing 48 and gears 98 and 100.

The other portion of the divided oil stream discharged from chamber 62 enters downwardly sloping conduits 143 machined in the vertical center base member 44. These conduits connect with annular chamber 144 formed in spacer 71. Openings in the vertical arm of spacer 76 communicate with annular opening 74 above bearing 67. Oil dropping from bearing 67 also drops over bearing 90, gear 104, gear 110 and gear 103. The oil which drops to the bottom of housing 66 maintains a level indicated by dotted line 145. This oil is effective to lubricate bearings 92 and 85 and gears 98 and 100. Consequently, all of the bearings and gears are constantly lubricated by the self-contained lubrication system within the head.

In operation, the upper and lower platens 17 and 18 are initially held in an elevated position and a bowl 11 is rolled under the head. Thereafter, a suitable control handle 146 is shifted to actuate hydraulic cylinder 35 which lowers platens 17 and 18 through the interconnection of piston 36 with platen 18. Simultaneously, the bowl clamping mechanism 15 is actuated and this mechanism is effective to clamp the upper rim of the bowl and to slightly raise the bowl above base 25. As platens 17 and 18 are lowered, head 20 moves downwardly and vertical beaters 22 and 23 enter receptacle 12. A hood 147 extends downwardly and outwardly from the lower portion of the head and covers the open top receptacle during the mixing operation.

Thereafter, a suitable switch (not shown) is actuated to energize motor 21. This motor is effective to rotate main shaft 43 through belts 41. When main shaft 43 is rotated, main drive pinion 100, which is keyed to the lower portion of the main drive shaft, rotates and in turn drives gear 98 which is keyed to the agitator shaft. Thus, the agitator shaft is rotated, also rotating gear 103 which is keyed to the agitator shaft and drives pinions 104 and 110 on idler shaft 105. Pinion 110 is in engagement with sun gear 65. Since sun gear 65 is stationary, when pinion 110 is rotated the pinion is driven in a circle around the stationary sun gear. Pinion 110 carries shaft 105 with it and since shaft 105 is supported by ears 108 formed on the inner surface of the housing, the housing is also caused to rotate about its upper bearing 68 and its lower bearing 85. Consequently, a compound motion is imparted to the agitator shaft. In the first place, agitator shaft 24 is rotated about its own axis, and at the same time the shaft is moved planet-wise about the axis of shaft 43. A portion of the sideways thrust imposed upon the agitator shaft is transmitted through bearing 92 to bottom plate 77 of housing 66. The inertia of this heavy depending housing member absorbs some of this force. However, a portion of the force is transmitted to main shaft 43 through bearing 85.

It will readily be appreciated that bearing 85 and drive pinion 100 are disposed very close to radial thrust bearing 48, while this latter bearing is spaced a substantial distance from upper bearing 54. Consequently, the effects of the forces tending to bend shaft 43 are minimized. Moreover, a portion of the sideways thrust imposed by agitator shaft 24 is applied directly to the stationary sun gear 65 through the planetary gear train, while other portions of the sideways thrust are applied direct to center post 44 through upper bearing 67 which supports the upper end of housing 66.

The rotation of main drive pinion 100 also is effective to operate gear driven oil pump 114. The inlet line of this pump draws oil from the sump formed by base plate 77. The pump forces oil under pressure through outlet line 118 and bores 120, 121 and 122 in the base plate and cover plate and through bores 124 and 125 of connector member 123. The oil flows upwardly under pressure through annular bore 125 in the agitator shaft and forces plunger 137 upwardly from its seat 138, the displacement of this plunger being correlated with the amount of oil flow. The oil stream then flows downwardly through the bore 140 formed in the upper end of shaft 43 and is ultimately discharged from that bore into chamber 58 of oil distributor member 57. From this chamber the oil flows outwardly through bore 60 into annular chamber 62 from which the oil drops through upper bearing 54. The oil flow over this bearing divides so that a portion of the oil flows downwardly through the annular space 142 surrounding shaft 43 and over bearing 48. The other portion of the oil flows downwardly through sloping conduits 143 formed in stationary base 44. This oil then passes into annular opening 44 and through suitable openings in spacer member 71 and enters annular chamber 74 from which the oil is discharged over bearing 67. A portion of the oil discharged from this bearing drops directly into the sump while other portions of the oil drops onto bearing 90, 106, and 107 and onto gears 103, 104, 110, and 65 from which the oil drops into the sump. Main pinion 100 and gear 98 are continuously lubricated by oil within the sump and bearings 85 and 92 are lubricated by oil in a similar manner. When desired, the sump can be drained through drain plug 148 and fresh oil can be introduced through filling 150.

Having described our invention, we claim:

1. In a vertical mixer having an elevated frame member, the improvement which comprises a head, said head including a depending hollow rigid center member secured to said frame member and having a central vertical bore extending completely therethrough, a main drive shaft, means rotatably journalling said main drive shaft for rotation within the bore of said hollow center member, said drive shaft extending upwardly beyond said bore, a motor, means interconnecting said motor and the upper end of said main drive shaft, a heavy bell shaped housing member, means disposed adjacent to the top of said housing member for rotatably supporting said housing member from said center member, a sun gear extending horizontally around the periphery of said center member, a vertically disposed agitator shaft, means carried by said housing for rotatably journalling said agitator shaft, first gear means interconnecting said agitator shaft and said drive shaft, said first gear means comprising a drive gear mounted upon said drive shaft and a driven gear mounted upon said agitator shaft in engagement with said drive gear, second planetary gear means interconnecting said agitator shaft and said sun gear, whereby said agitator shaft is rotated on its own axis and is simultaneously moved in a planetary movement about the axis of said main drive shaft, a bottom wall secured to said bell-shaped housing member, bearing means carried by said bottom wall and engaging said drive shaft below said drive gear, said bell shaped housing being effective to act as an inertia member and absorb some of the shock loads of said agitator shaft.

2. In a vertical mixer having an elevated frame member, the improvement which comprises a head, said head including a depending hollow rigid center member secured to said frame member and having a central vertical bore, a main drive shaft, upper and lower shaft bearing means rotatably journalling said main drive shaft for rotation within the bore of said hollow center member, the bore in said center member being larger than the diameter of said main drive shaft, a motor, means interconnecting said motor and said main drive shaft, a bell shaped housing member, upper housing bearing means disposed adjacent to the top of said housing member for rotatably supporting said housing member from said center member, a base plate enclosing the bottom of said housing, means journalling said base plate upon the lower end of said main drive shaft, a sun gear extending horizontally around the periphery of said center member, a vertically disposed agitator shaft, means carried by said housing for rotatably journalling said agitator shaft, first gear means interconnecting said agitator shaft and said drive shaft, second planetary gear means interconnecting said agitator shaft and said sun gear, whereby said agitator shaft is rotated on its own axis and is simultaneously moved in a planetary movement about the axis of said main drive shaft, and lubricating means disposed within said housing member, said lubricating means comprising a gear pump, means mounting said gear pump within said housing in mechanical connection with said drive shaft, said main drive shaft having a vertical bore formed therein, conduit means interconnecting said pump and said bore, means interconnecting said bore and said upper shaft bearing means, conduits interconnecting said upper shaft bearing means and said upper housing bearing means, said last named bearing means being disposed above said planetary gear means, whereby oil drops from said upper shaft bearing onto said upper housing bearing and onto said planetary gear means, and oil drops from said upper shaft bearing onto said lower shaft bearing.

3. In a vertical mixer having an elevated frame member, the improvement which comprises a head, said head including a depending hollow rigid center member secured to said frame member and having a central vertical bore, a vertically disposed main drive shaft, means rotatably journalling said main drive shaft for rotation within the bore of said hollow center member, said means comprising an upper bearing disposed adjacent to the upper portion of said bore, and a lower bearing disposed adjacent to the lower end of said bore, said shaft having an upper portion extending upwardly beyond said bore, a motor, means interconnecting said motor and said main drive shaft, a heavy bell shaped housing member, means disposed adjacent to the top of said housing member for rotatably supporting said housing member from said center member, a sun gear extending horizontally around the periphery of said center member, a vertically disposed agitator shaft, upper and lower bearing means carried by a peripheral wall of said housing for rotatably journalling said agitator shaft, first gear means interconnecting said agitator shaft and said drive shaft, said first gear means comprising a driving pinion mounted upon said main drive shaft closely adjacent to said lower bearing, and a driven pinion mounted on said agitator shaft in meshing engagement with said driving pinion, second planetary gear means interconnecting said agitator shaft and said sun gear, and a base plate enclosing the bottom of said housing member, bearing means rotatably journalling said base plate upon said main drive shaft below and closely adjacent to said driving pinion, whereby said agitator shaft is rotated on its own axis and is simultaneously moved in a planetary movement about the axis of said main drive shaft.

References Cited in the file of this patent

UNITED STATES PATENTS

| | | |
|---|---|---|
| 1,781,321 | Dehuff | Nov. 11, 1930 |
| 1,785,562 | Schiff | Dec. 16, 1930 |
| 2,334,775 | Karp | Nov. 23, 1943 |
| 2,808,239 | Reiffen | Oct. 1, 1957 |